United States Patent [19]

Hirahara

[11] Patent Number: 5,920,466
[45] Date of Patent: Jul. 6, 1999

[54] SWITCHING POWER SUPPLY UNIT

[75] Inventor: Hiroaki Hirahara, Osaka, Japan

[73] Assignee: Matsushita Electric Industrial Co., Ltd., Osaka, Japan

[21] Appl. No.: 08/884,875

[22] Filed: Jun. 30, 1997

[30] Foreign Application Priority Data

Jun. 29, 1996 [JP] Japan .................................. 8-188474

[51] Int. Cl.$^6$ .......................... H02M 3/335; H02M 7/44
[52] U.S. Cl. ............................................. 363/21; 363/97
[58] Field of Search ................................ 363/20, 21, 95, 363/97, 131

[56] References Cited

U.S. PATENT DOCUMENTS 4,292,490 9/1981 Bell, Jr. et al. ........................... 219/69

4,812,959 3/1989 Driscoll et al. ........................... 363/20
5,019,953 5/1991 Kawaberi et al. ........................ 363/21

FOREIGN PATENT DOCUMENTS 4-172090 6/1992 Japan .

Primary Examiner—Matthew Nguyen
Attorney, Agent, or Firm—Ratner & Prestia

[57] ABSTRACT

An inexpensive power supply unit which may be used for video display devices is provided. The unit saves power when supplying power to a light load, such as during remote control standby. Power for a controller which controls each part of a video display device is supplied from the switching power supply. Power consumption of the switching power supply is reduced by extending an OFF period setting for the switching power supply when operation of a display drive circuit is turned off.

9 Claims, 8 Drawing Sheets

FIG. 3A  VOUT 0V 
FIG. 3B  ID 0A
FIG. 3C  VDS 0V 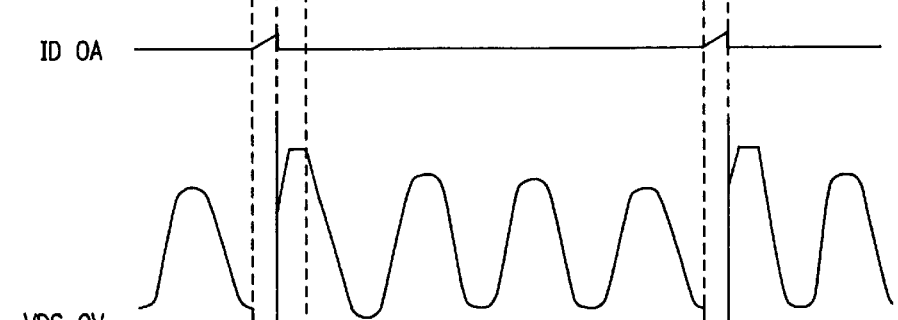
FIG. 3D  VS 0V 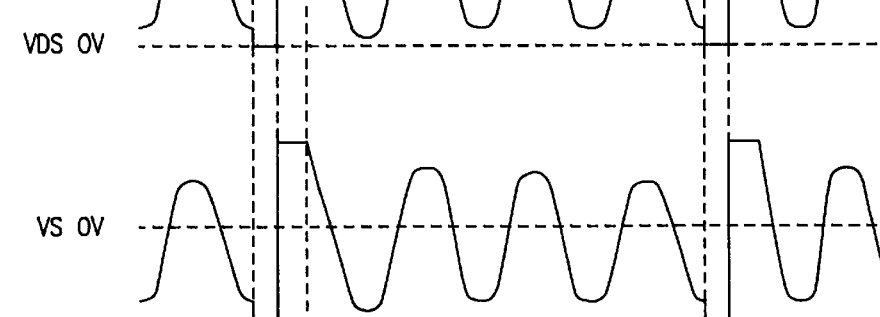
FIG. 3E  VTH VDL 0V 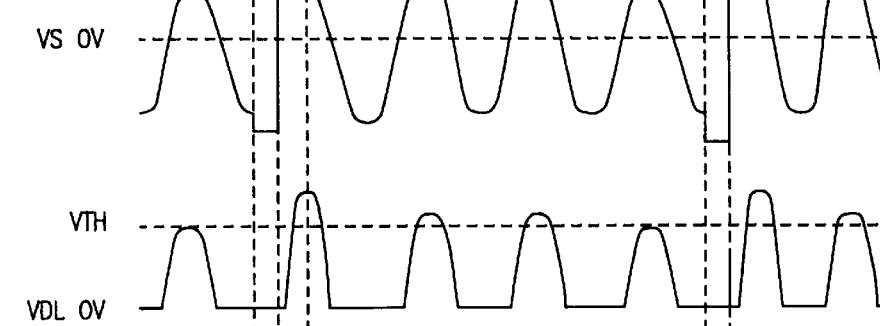
FIG. 3F  4V VFB 2.4V VCF 0V

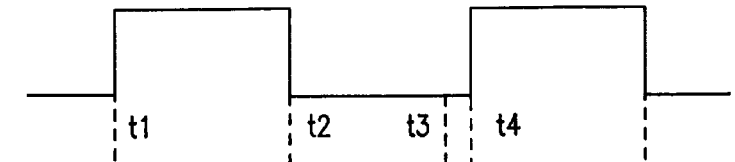
FIG. 4A VOUT 0V
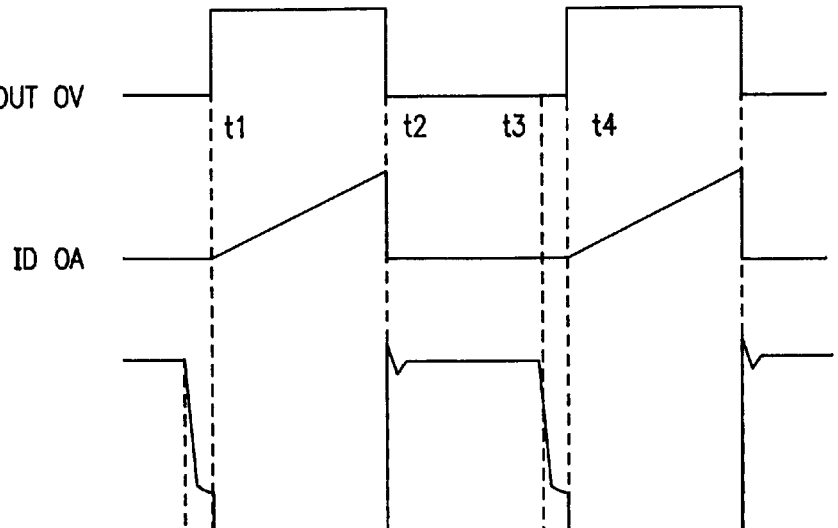
FIG. 4B ID 0A
FIG. 4C VDS 0V
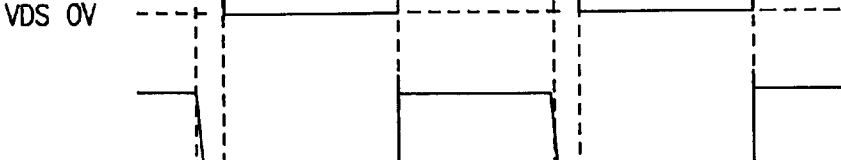
FIG. 4D VS 0V
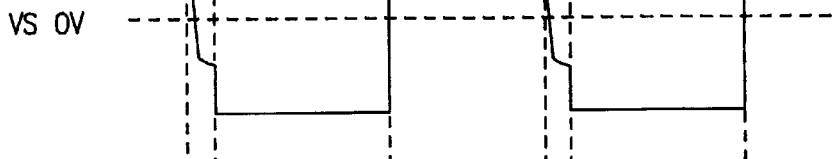
FIG. 4E VTH VDL 0V
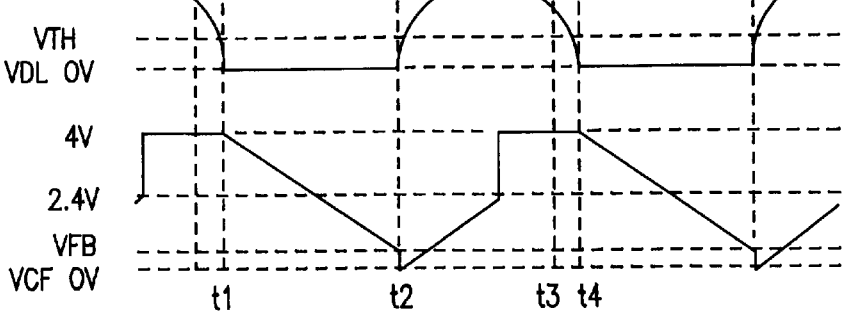
FIG. 4F VFB VCF 0V

FIG. 7A VOUT 0V 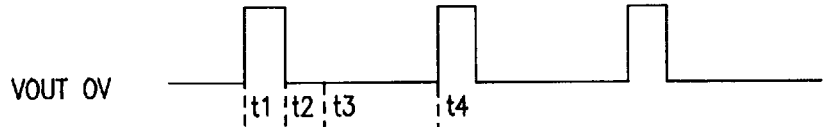
FIG. 7B ID 0A 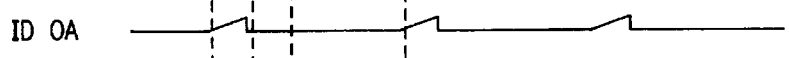
FIG. 7C VDS 0V 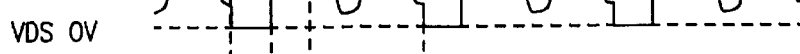
FIG. 7D VS 0V 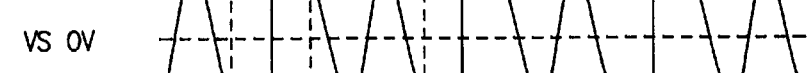
FIG. 7E VTH VDL 0V 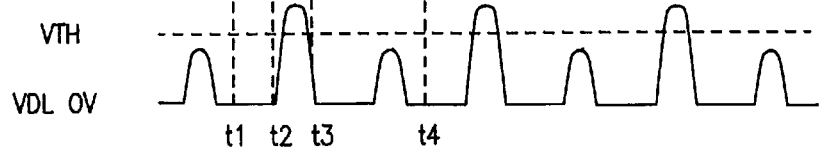
PRIOR ART

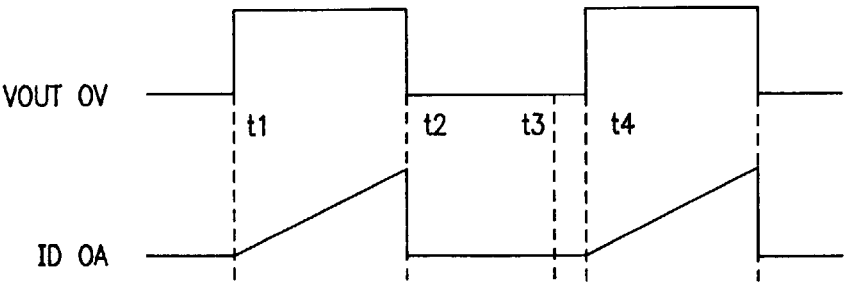
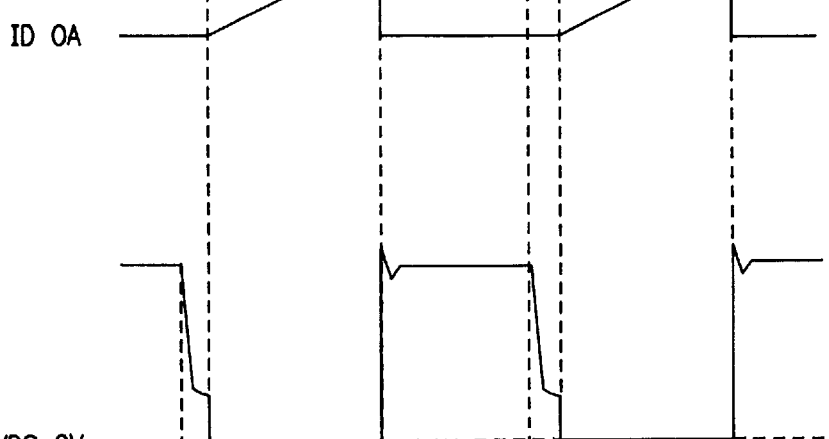
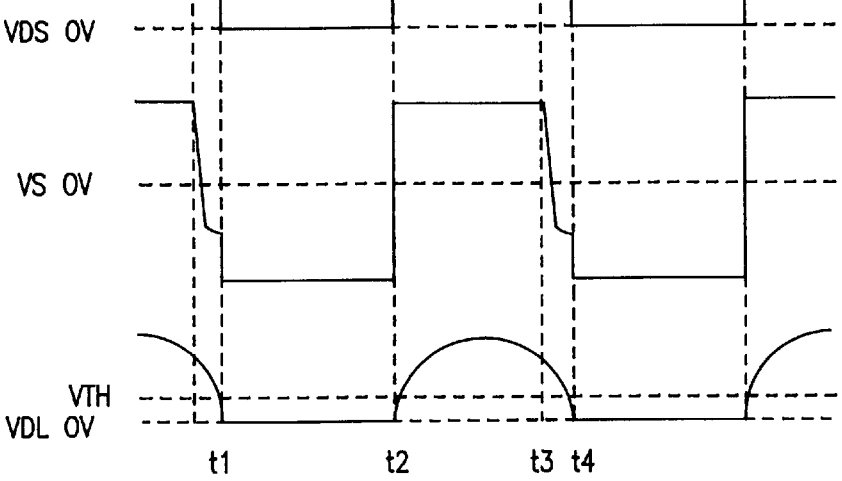
FIG. 8A VOUT 0V
FIG. 8B ID 0A
FIG. 8C VDS 0V
FIG. 8D VS 0V
FIG. 8E VDL 0V / VTH
PRIOR ART

SWITCHING POWER SUPPLY UNIT

FIELD OF THE INVENTION

The present invention relates to the field of power supply units generally, and more specifically to exemplary power supply units which are used for video display devices including television sets and display monitors for computers.

BACKGROUND OF THE INVENTION

Conventional power supply units for video display devices, for example television sets, use a single converter for supplying the power necessary for heavy loads such as during watching TV and for light loads when the TV is turned off or in the remote control standby state by employing a self-excited power supply (hereafter referred to as "switching power supply"). This system, however, causes great loss in the remote control standby state because the energy continuously regenerates in the switching element and transformer. (Refer to Japanese Laid-open Patent H4-172090.)

One alternative system is to employ two power supplies: a main power supply and a power supply for a control means such as a microcomputer (hereafter referred to generically as the microcomputer). This system is described below with reference to drawings.

FIG. 6 illustrates an electric circuit diagram for the power supply unit of the prior art which employs two power supplies. First, the configuration of a circuit for the main power supply is explained. AC power 1 is connected to the input terminal of a main bridge rectifier 4 through a line filter 2 and a main relay switch 3. The output terminal of the main bridge rectifier 4 is connected to the parallel circuit of a series circuit of the primary winding 6 of a transformer 5 for the main converter and a field effect transistor (FET) 7, acting as a switching element, and a smoothing electrolytic capacitor 8. A secondary winding 9 of the transformer 5 for the main converter is connected to a DC output voltage terminal 12 for a deflecting and high-voltage circuit through a relay switch 10 and a rectifying diode 11. Secondary windings 13 and 14 are connected to DC output voltage terminals 17 and 18 for 15 V and 7 V signal processors (not illustrated) through respective rectifying circuits 15 and 16. A second winding 19 is connected to a DC output voltage terminal 21 for a 30 V audio circuit through a rectifying diode 20.

The output side of the rectifying diodes 11, 15, 16, and 20 are connected to smoothing electrolytic capacitors 22, 23, 24, and 25 respectively.

The DC output voltage terminal 17 for the 15 V signal processor is grounded through a current-limiting resistance 26, a Zener diode 27, a light emitting diode 29 in a photocoupler 28, a Zener diode 30, and a transistor 31. The current $I_{BF}$ which flows to the collector of a phototransistor 32 in a photocoupler 28 is the feedback current to a controller 33 for the main converter.

The output terminal of the controller 33 for the main converter is connected to the gate terminal of FET 7, and a resonant capacitor 34 is connected between the source and drain terminals of FET 7.

The voltage of a bias winding 35 of the transformer 5 for the main converter is integrated by a integrator 36 and is input to the controller 33 for the main converter.

The DC output voltage terminal 12 for the deflecting and high-voltage circuit is, through an error amplifier 37, connected to the contact point of a light emitting diode 29 in the photocoupler 28 and the Zener diode 30.

A ▽ mark in the figure indicates the ground (GND) of the primary winding of the transformer 5 for the main converter. The same mark is used in other figures.

The DC output voltage terminals 17 and 18 are connected to signal processors (not illustrated) through a three-terminal regulator (not illustrated) which is turned on and off by the control signal from a microcomputer 41 described below.

The configuration of a circuit for the power supply for the microcomputer is described next.

The primary winding of a power transformer 38 for the microcomputer is connected to the output terminal of the line filter 2, and the secondary winding of the power transformer 38 for the microcomputer is connected to the input terminal of a bridge rectifier 39. The output terminal of the bridge rectifier 39 is connected to a regulator 40 which converts the power supply voltage to 5V for use by the microcomputer.

The output voltage of the regulator 40 is supplied to the microcomputer 41.

The microcomputer 41 controls ON and OFF of the main relay switch 3, relay switch 10, and transistor 31 as it receives the input signal from a remote control receiver 42 and a main key 43 on a television set.

A smoothing electrolytic capacitor 44 is connected to the output terminal of the bridge rectifier 39.

Next, the operation of the power supply unit of the prior art as configured above is described.

Firstly, the power supply for the microcomputer is discussed.

The power transformer 38 for the microcomputer is connected to AC power 1 through the line filter 2, and AC 12 V is output to its secondary winding.

The bridge rectifier 39 conducts full-wave rectification of the AC 12 V output and the smoothing electrolytic capacitor 44 smoothes it to generate the DC output.

Then DC 5 V generated by the regulator 40 is supplied to the microcomputer 41.

The microcomputer 41 receives and decodes the remote control signal from the remote control receiver 42 and the input signal from the main key 43 on the television set, and outputs ON and OFF control signals to the main relay switch 3 and relay switch 10. The microcomputer 41 also outputs other signals for performing a range of controls of the television set.

As long as the television set is plugged into AC power 1, the power transformer 38 for the microcomputer supplies DC voltage to the microcomputer 41, thereby allowing the microcomputer 41 to operate continuously.

Secondly, the main power supply is discussed.

When the power key is turned on using the remote control or the main key, the microcomputer 41 outputs the control signal for turning on the main relay switch 3.

When the main relay switch 3 turns on, the main bridge rectifier 4 conducts full-wave rectification of the voltage of AC power 1 and the smoothing electrolytic capacitor 8 smoothes it to generate DC voltage.

When the DC voltage reaches a certain level, the controller 33 for the main converter for switching power supply activates to generate voltage in the secondary windings 9, 13, 14, and 19 of the transformer 5 for the main converter.

Here, voltage is generated in the DC output voltage terminals 17, 18, and 21 at the secondary side but not in the DC output voltage terminal 12 because the relay switch 10 is turned off and the transistor 31 is turned on by the microcomputer 41. Voltage in DC output voltage terminals 17, 18, and 21 increases and levels off to a steady state when the voltage reaches a certain level.

Under the above conditions, no video image is displayed on the screen because the deflecting and high-voltage circuit (not illustrated) is connected to the DC output voltage terminal 12 which is not in operation. Since the audio output circuit (not illustrated) is also turned off, only the signal processors (not illustrated) connected to the DC output voltage terminal 17 and 18 are operational (hereafter referred to as the remote control standby mode).

When a certain time passes after the signal processors (not illustrated) are activated and output signals including horizontal and vertical drive pulses are stably output, the microcomputer 41 then outputs the control signal for turning on the relay switch 10 and turning off the transistor 31.

When the relay switch 10 turns on, the rectifying diode 11 rectifies the voltage generated in the secondary winding 9, and the smoothing electrolytic capacitor 22 smoothes it to supply DC voltage to the DC output voltage terminal 12.

The DC voltage gradually increases and levels off at a steady state when the voltage reaches a certain level. At this point the output voltage is stabilized at 140V, and the deflecting and high-voltage circuit and the audio output circuit operate so that the television is ready to be watched in a normal mode (hereafter referred to as the TV mode).

Thirdly, operation in the remote control standby mode is explained with reference to FIG. 7 illustrating operating waveforms. FIG. 7 shows the waveform at each part illustrated in FIG. 6 in the remote control standby mode.

In this mode, the relay switch 10 is turned off and the transistor 31 is turned on by the microcomputer 41 using its control signal.

FIG. 7(a) shows the drive waveform VOUT which is output from the controller 33 for the main converter to FET 7, and FIG. 7(b) shows the waveform ID of the current in FET 7. The current from the drain terminal to the source terminal is considered the forward direction.

FIG. 7(c) shows the voltage VDS between the drain and source of FET 7, FIG. 7(d) is the output voltage VS of the bias winding 35, and FIG. 7(e) is the waveform VDL of the voltage input to the main controller after integrated by the integrator 36.

When VOUT becomes H(HIGH) at the time t1, FET 7 turns on and the current ID starts to flow. Then, the primary current in the primary winding 6 induces magnetic flux in the transformer 5 for the main converter which accumulates energy. At the same time, the voltage is induced in the secondary windings 9, 13, 14, and 19 of the transformer 5 for the main converter.

However, since the relay switch 10 is turned off, the induced voltage is not applied to the rectifying diode 11. No secondary current flows because the polarity of the rectifying diodes 15, 16, and 20 are configured in a way to induce voltage to reverse bias.

Voltage is also induced in the bias winding 35, but it is configured to generate the voltage in the inverse phase against VOUT. Therefore, VS becomes a negative voltage. The waveform VDL which passes through the integrator 36, and input to the controller 33 for the main converter is clamped to 0V by the clipper/clamper circuit built in the controller 33 for the main converter. After the ON period set by the controller 33 for the main converter is completed, VOUT switches to L(LOW) at the time T2, and FET 7 turns off.

When FET 7 turns off, flyback voltage occurs in the primary winding 6 and secondary windings 9, 13, 14, and 19, which induces voltage in forward bias to the rectifying diodes 15, 16, and 20 at the secondary side.

Energy accumulated in the transformer 5 for the main converter is then discharged as secondary current through the secondary windings 13, 14, and 19. The current is smoothed by the smoothing electrolytic capacitors 23, 24, and 25, and the required voltage is output respectively from the DC output voltage terminals 17, 18 and 21.

On the other hand, the flyback voltage VS occurred in the bias winding 35 at the primary side becomes a waveform shown as VDL after it goes through the integrator 36, and is input to the controller 33 for the main converter. At the time T3, energy accumulated in the transformer 5 for the main converter has been completely discharged as secondary current, and the flyback voltage induced by the secondary windings 13, 14, and 19 reverses. This will cause reverse bias in the rectifying diodes 15, 16, and 20 at the secondary side, which will turn off the secondary current.

The flyback voltage produced in the primary winding 6 is reversed, and energy accumulated in the resonant capacitor 34 is discharged. This will start resonance with the inductance of the primary winding 6, and voltage VDS between the drain and source of FET 7 oscillates as shown in FIG. 7(c).

In general, with regard to switching power supply, the frequency for repeating the above ON and OFF cycle increases as the load becomes lighter, which will make it difficult to prevent electromagnetic interference.

Therefore, the controller 33 for the main converter has a function for setting the minimum OFF period to prevent the OFF period from being shorter than the set minimum OFF period.

In the remote control standby mode, energy in the transformer 5 is completely discharged by the time t3 which is within the set minimum OFF period. However, the OFF period continues until the minimum OFF period ends at the time t4.

After the minimum OFF period set to the time t4 is completed, the controller 33 for the main converter outputs H to VOUT. Operation after H is output to VOUT restarts from the time t1.

Fourthly, how the output voltage is controlled and stabilized in the remote control standby mode is explained. In this mode, the DC output voltage terminal 17 at the secondary side is stabilized at 15V. No current flows to the error amplifier 37 because the relay switch 10 is turned off and the voltage of the DC output voltage terminal 12 is 0V. The current in the photocoupler 28 flows from the DC output voltage terminal 17 through the current limiting resistance 26, Zener diode 27, light emitting diode 29 of photocoupler 28, Zener diode 30, and transistor 31.

If a 7.5 V Zener diode 27 and a 6.8 V Zener diode 30 are selected, and forward voltage in the light emitting diode 29 of the photocoupler 28 is considered around 0.7V, the total voltage is 15V. The output voltage of the DC voltage terminal 17 is stabilized as described below to this total 15V.

If the DC output voltage terminal 17 has a voltage higher than 15V, the current flowing to the light emitting diode 29 of the photocoupler 28 increases, thereby increasing the collector current in the phototransistor 32 at the primary side.

The collector current in the phototransistor 32 operates as a feedback current to the controller 33 for the main converter.

If the feedback current increases, the controller 33 for the main converter shortens the ON period of VOUT to reduce the drain current in FET 7 (the primary current in the transformer 5 for the main converter) so as to reduce energy accumulated in the transformer 5 for the main converter per unit time.

When energy accumulated in the transformer 5 for the main converter is reduced, the voltage in the DC output voltage terminal 17 at the secondary side falls due to the decrease in voltage in the secondary winding. If the output voltage is lower than 15V, the reverse operation takes place to increase the output voltage.

The signal processor (not illustrated) is a load connected to the DC output voltage terminal 17. Since the load does not vary significantly in the signal processor, the output voltage of the DC output voltage terminal 17 can be fully stabilized using the above stabilization control.

Fifthly, operation in the TV mode is explained with reference to the operating waveforms in FIG. 8.

FIG. 8 shows operating waveforms of each part in FIG. 6 in the TV mode. FIGS. 8(a) to (e) are waveforms at the same positions in FIG. 6 as indicated in FIG. 7.

Operation during the time t1 to t3 is the same as that in the remote control standby mode, but load is heavier in the TV mode than in the remote control standby mode. Therefore, as shown in FIG. 8(a), the ON period between the time t1 and t2, and the secondary current discharge period between the time t2 and t3 are longer than those in the remote control standby mode.

Drain current ID in FET 7, as shown in FIG. 8(b), is also larger in the TV mode than in the remote control standby mode.

When energy stored in the transformer 5 for the main converter is completely discharged as the secondary current at the time t3, the flyback voltage induced by the secondary windings 9, 13, 14, and 19 is reversed. Reverse bias then occurs in the rectifying diodes 11, 15, 16, and 20 at the secondary side and the secondary current will be turned off.

The flyback voltage generated in the primary winding 6 also reverses to discharge energy stored in the resonant capacitor 34, and resonance with the inductance of the primary winding 6 starts.

Then, as shown in (c), the voltage VDS between the drain and source of FET 7 starts to fall.

Here, the minimum OFF period set in the controller 33 for the main converter is shorter than the time t3. After the minimum OFF time is completed, FET 7 turns on at the time when VDL in FIG. 8(e) passes below the threshold VTH of the controller 33 for the main converter.

By setting the constant of the integrator 36 in a way that VDL passes below the threshold VTH at the time t4 when the resonance voltage of the voltage VDS between the drain and source is at a minimum, the controller 33 for the main converter turns on when detecting the reset of the transformer 5 for the main converter, and outputs H to VOUT at the time t4.

Operation after VOUT becomes H is same as that from the time t1.

Sixthly, how the voltage of the DC output voltage terminal 12 is stabilized in the TV mode is explained. In the TV mode, the transistor 31 is turned off, and the current flowing to the light emitting diode 29 of the photocoupler 28 is supplied from the DC output voltage terminal 17, and controlled by the error amplifier 37.

The error amplifier 37 has a built-in reference voltage so that the current flowing to the light emitting diode 29 in the photocoupler 28 decreases if the voltage of the DC output voltage terminal 12 is lower than the reference voltage.

Operation of the controller 33 for the main converter after this is the same as that in the remote control standby mode, and the voltage of the DC output voltage terminal 12 increases.

If the voltage of the DC output voltage terminal 12 exceeds the reference voltage in the error amplifier 37, the reverse operation takes place to reduce the voltage of the DC output voltage terminal 12. In this way, the voltage is maintained at the same level even when the voltage of the DC output voltage terminal 12 fluctuates.

If the power key on the remote control or the television set is pressed in the TV mode, the mode switches to the remote control standby mode following the reverse procedures as the above.

The power supply unit configured as above which employs two power supplies, however, still consumes a considerable amount of power in the remote control standby mode. In addition, it needs extra parts, such as a power transformer 38, bridge rectifier 39, and smoothing electrolytic capacitor 44 for producing a power supply voltage for the microcomputer 41. This will require a larger power transformer and other components, resulting in occupation of larger area on the printed circuit board and increased overall costs.

An object of the present invention is to solve the above disadvantages and provide a smaller and more inexpensive power supply unit, which can conserve energy when supplying power to a light load, such as in the remote control standby mode, for video display devices.

SUMMARY OF THE INVENTION

To solve the disadvantages described above, the power supply unit of the present invention comprises a means for setting an OFF period, a means for controlling an ON period, and a means for controlling the output power after it reaches a specified minimum power in the ON period by extending the OFF period setting. The present invention employs a controller for the main converter which controls the output power using the OFF period longer than the setting and the ON period controlled by the above means. The control range of the controller for the main converter broadens by extending the OFF period setting.

A switching power supply unit which controls heavy loads cannot simply control light loads without any modifications, since the range of output power that the switching power supply unit can control is limited.

Therefore, for controlling the output voltage for light loads, the switching power supply unit employs a means for extending the OFF period after reducing the ON period to a certain extent without further compressing the ON period to an extremely short period. With the use of this method, the switching power supply unit of the present invention can control both heavy loads and light loads with the same switching power supply.

The switching power supply unit of the present invention thus enables the reduction of power consumption for light loads and offers a smaller and more inexpensive unit.

BRIEF DESCRIPTION OF THE DRAWINGS

FIGS. 3a–f illustrate operating waveforms of the power supply unit of FIG. 1 in the remote control stand by mode.

FIGS. 4a–f illustrate operating waveforms of the power supply unit of FIG. 1 in the TV mode.

FIGS. 7a–e illustrate operating waveforms of the power supply unit of FIG. 6 in the remote control stand by mode.

FIGS. 8a–e illustrate operating waveforms of the power supply unit of FIG. 6 in the TV mode.

DETAILED DESCRIPTION OF THE INVENTION

1st exemplary embodiment

Figure 1:
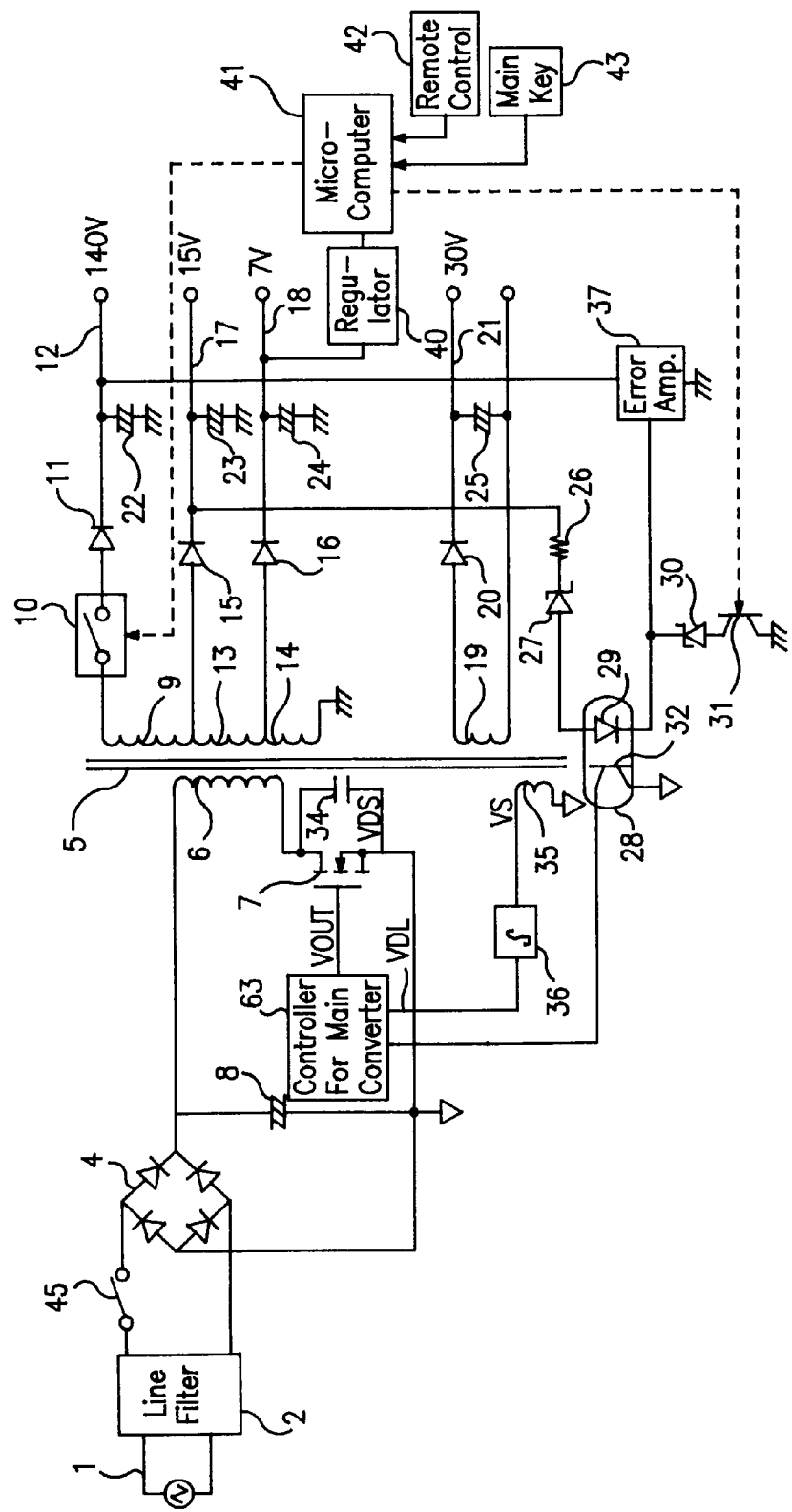
FIG. 1 is an electric circuit diagram of a power supply unit according to the first embodiment of the present invention.

FIG. 1 is an electric circuit diagram of a power supply unit of a first exemplary embodiment of the present invention as used for supplying power to a video display device. A difference in circuit configuration as compared with FIG. 6 which illustrates a diagram for the prior art is that, in FIG. 1, the power supply for the microcomputer 41 is taken from the DC output voltage terminal 18 of the secondary winding 14 of the transformer 5 for the main converter, whereas, in FIG. 6, the power supply for the microcomputer 41 is taken from a power transformer 38 which is provided separately from the transformer 5 for the main converter of the switching power supply. The remaining items in FIG. I are the same as the similarly numbered items in FIG. 6 and, for brevity, descriptions of these items is not repeated.

Since the function and operation of a controller 63 for the main converter in the power supply unit of the present invention is different from that of the prior art, they are explained later.

In FIG. 1, the microcomputer 41 receives and decodes the input signal from the remote control receiver 42 and main key 43 on the television set, and sends out the control signal to the relay switch 10 and transistor 31.

Power for the microcomputer 41 is supplied from the DC output voltage terminal 18 of the secondary winding 14 of the transformer 5 for the main converter of the switching power supply through the regulator 40.

When a main relay switch 45 turns on, the voltage of the AC power 1 is input to the main bridge rectifier 4 through the line filter 2. The main bridge rectifier 4 conducts full-wave rectification of the voltage of the AC power 1 and the smoothing electrolytic capacitor 8 smoothes it.

When the voltage of the smoothing electrolytic capacitor 8 reaches a certain level, the controller 63 for the main converter activates to generate voltage in the secondary windings 9, 13, 14, and 19 of the transformer 5 for the main converter. At this point, the microcomputer 41 is initially set to send out the control signal to turn off the relay switch 10 and turn on the transistor 31.

Since the relay switch 10 is turned OFF, the voltage does not increase in the DC output voltage terminal 12, but increases in the DC output voltage terminals 17, 18, and 21.

When the voltage in the DC output voltage terminal 17 reaches 15V, it is leveled off to a steady state, as described before, by flowing the current through the current limiting resistance 26, Zener diode 27, light emitting diode 29 in the photocoupler 28, Zener diode 30 and transistor 31.

When the voltage of the DC output voltage terminal 18 also reaches 7V, the regulator 40 supplies 5 V DC voltage to the microcomputer 41 to start its operation. After the operation is stabilized, the microcomputer 41 outputs the control signal to turn off a three-terminal regulator (not illustrated) which supplies stable voltage to the signal processor (not illustrated) so as to suppress extra power consumption (hereafter referred to as the remote control standby mode).

Next, operation of the controller 63 for the main converter which drives FET 7 is discussed.

Figure 2:
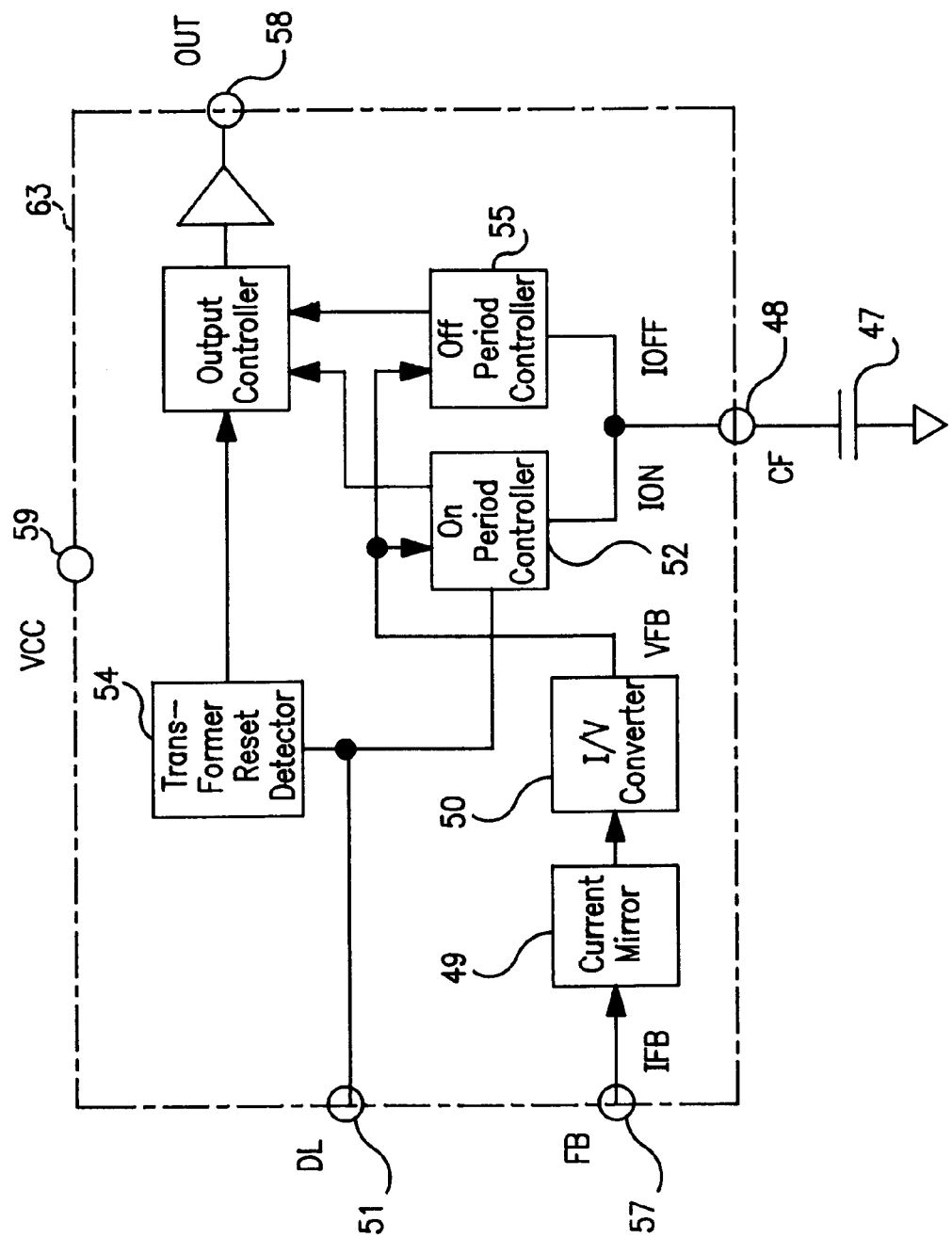
FIG. 2 is a block diagram of the controller for the main converter of a power supply unit of FIG. 1.

FIG. 2 is a block diagram of the controller 63 for the main converter in FIG. 1. Parts not necessary for explaining the following operation of the controller 63 for the main converter are omitted in FIG. 2.

Firstly, the input and output terminals of the controller 63 for the main converter are explained below.

A FB terminal 57 is connected to the phototransistor 32 in the photocoupler 28. The feedback current generated in the phototransistor 32 flows to the FB terminal 57 through the controller 63 for the main converter.

A capacitor 47 is connected to the CF terminal 48, and the other end of the capacitor 47 is grounded. This capacitor 47 determines the ON and OFF periods of the output voltage VOUT from the controller 63 for the main converter.

A DL terminal 51 is connected to the integrator 36. This is the terminal where the control voltage VDL is applied.

An OUT terminal 58 is an output terminal of the controller 63 for the main converter, and it outputs the output voltage VOUT for driving FET 7.

A VCC 59 is a power supply terminal of the controller 63 for the main converter.

Secondly, operation of the controller 63 for the main converter in the remote control standby mode is explained. FIG. 3 illustrates operating waveforms in the remote control standby mode.

FIGS. 3(a) to (e) are operating waveforms under the same conditions as FIG. 7. FIG. 3(f) is a waveform of the CF terminal 48 in FIG. 2.

When the control voltage VDL which is input to the DL terminal 51 is higher than the threshold VTH, a transformer reset detector 54 outputs H(HIGH) to output controller 56 so as to make the output controller 56 ignore the output from an OFF period controller 55 and prohibit outputting the signal (H to VOUT) for passing the current through the OUT terminal 58 to FET 7.

When the control voltage VDL which is input to the DL terminal 51 is lower than the threshold VTH, the transformer reset detector 54 outputs L(LOW) to the output controller 56 so as to output a signal for passing the current through the OUT terminal 58 to FET 7 if there is output from the OFF period controller 55.

In the remote control standby mode, load power at the secondary side of the transformer 5 for the main converter is about 0.7 W around the microcomputer 41 and its peripheral circuit, which is extremely light.

The current mirror circuit 49 amplifies the feedback current IFB five times larger, and the I/V converter 50 converts it to the voltage VFB.

A light load increases the voltage at the secondary side, which increases the current IFB in the phototransistor at the primary side, which is the feedback current to the controller 63 for the main converter, thereby increasing VFB.

On the contrary, a heavy load reduces the voltage at the secondary side, which decreases the current IFB which is the feedback current to the controller 63 for the main converter, thereby reducing VFB.

At this point, a waveform of the voltage VCF of the capacitor 47 which determines the ON/OFF period, will look as illustrated in FIG. 3(f). The capacitor 47 is charged to 4V at the time t1, and gradually discharges with the resistance (not illustrated) in the integrator 36 connected to the DL terminal 51.

When terminal voltage VCF of the capacitor 47 decreases and reaches aforementioned VFB (at the time t2), the ON period controller 52 outputs a signal to the output controller 56.

The output controller 56 switches the output voltage VOUT of the controller 63 for the main converter to L at receiving this signal (in other words, cuts off FET 7). At the same time, the ON period controller 52 completely discharges the capacitor 47 almost instantaneously to reduce VCF to nearly 0V, and the ON period is completed at t2.

When VCF nearly reaches 0V, the OFF period controller 55 immediately starts to charge the capacitor 47.

At the time t4, when VCF reaches VFB, the OFF period controller 55 outputs a signal to the output controller 56.

Next, how the minimum OFF period is extended is explained.

The OFF period controller 55 starts to charge the capacitor 47 with a relatively sharp increase (using a short time constant) until the charged voltage reaches a preset voltage of 2.4V.

After the capacitor 47 reaches 2.4V, the OFF period controller 55 reduces charge current and charges the capacitor 47 at a moderate speed (using a longer time constant).

The time required until the capacitor 47 is charged to 2.4V is the minimum OFF period. Note that the preset voltage is 2.4V in this exemplary embodiment, but the preset voltage can be set to any voltage between 0V and 4.0V.

If energy stored in the transformer 5 for the main converter is completely discharged as a secondary current at the time t3, the voltage VDS between the drain and source starts resonance with the capacitance of the resonant capacitor 34 and inductance of the transformer 5 for the main converter.

Although the transformer reset detector 54 outputs L during the minimum OFF period, the output controller 56 ignores it and resonance of the voltage VDS between the drain and source continues until the OFF period is completed.

When VCF reaches VFB at the time t4, the OFF period controller 55 outputs a signal to the output controller 56. Since the transformer reset detector 54 is set to L, the output controller 56 switches VOUT to H. At the same time, the output controller 56 notifies the OFF period controller 55 that VOUT is switched to H. The OFF period controller 55 then rapidly charges the CF capacitor 47 to 4V, and completes the OFF period.

Operation after VOUT is switched to H is the same as that from the time t1. Here, AC power consumption is about 1.3 W, and efficiency is about 54%.

Accordingly, the power supply unit of the present invention enables to prevent further shortening of the ON period, reduce the switching frequency, and decrease power loss in related devices by extending the OFF period.

Thirdly, operation of the controller 63 for the main converter in the TV mode (heavy load) is discussed.

FIG. 4 illustrates operating waveforms in the TV mode.

When the current passes through FET 7, and the capacitor 47 is charged to 4V (at the time t1), the capacitor 47 starts discharge through resistance (not illustrated) in the integrator 36 connected to the DL terminal 51. When the terminal voltage VCF of the capacitor 47 decreases and reaches the VFB (at the time t2), the ON period controller 52 outputs a signal to the output controller 56. Under heavy load, VFB is set to below the preset voltage (2.4V in the exemplary embodiment).

The output controller 56 switches the output voltage VOUT of the controller 63 for the main controller to L (cuts off FET 7) base on this signal. At the same time, the ON period controller 52 completely discharges the capacitor 47 almost instantaneously until VCF reaches 0V, and the ON period is completed at t2.

Immediately after this, the OFF period controller 55 starts to charge the capacitor 47.

When VFB is below the preset voltage (2.4V in the exemplary embodiment), no action is taken by the OFF period controller 55 although VCF increases and reaches VFB, the OFF period controller 55 outputs a signal to the output controller 56 only when VCF reaches the preset voltage (2.4V in the exemplary embodiment). The OFF period controller 55 then starts to rapidly charge the capacitor 47 up to 4V and the minimum OFF period is completed.

When energy stored in the transformer 5 for the main converter is completely discharged as secondary current at the time t3, the voltage between the drain and source starts resonance with the capacitance of the resonant capacitor 34 and inductance of the transformer 5 for the main converter. VS oscillates in the same way.

VDL also changes according to oscillation of VS. Since VDL never reaches below the threshold VTH before VDL once increases and decreases by said oscillation, the transformer reset detector 54 is H.

Under the heavy load, the time t3 is set later than the time when the minimum OFF period is completed. Therefore, VCF maintains 4V until the time t3 and the control signal from the OFF period controller 55 to the output controller 56 keeps H. When the transformer reset detector 54 is switched to L at the time t4, the output controller 56 outputs H to VOUT and turns on FET 7.

As explained above, the minimum OFF period is maintained by securing a period for VCF to increase from 0V to the preset voltage (2.4V in the exemplary embodiment).

When the power key on the remote control or the television set is pressed, the microcomputer 41 decodes the input signal from the remote control receiver 42 or the main key 43, and outputs the control signal to turn on the 3-terminal regulator (not illustrated) which supplies power to the signal processor (not illustrated).

When the 3-terminal regulator turns on, power supply voltage is supplied to the signal processor to start signal processing.

After the processor stabilizes, the microcomputer 41 outputs a range of data to the signal processor for initialization and, after a certain time, outputs the control signal for turning on the relay switch 10 and turning off the transistor 31.

Operation after the relay switch 10 is turned on is the same as that in the TV mode of the prior art.

When the power key on the remote control or the television set is pressed in the TV mode, the power supply unit follows the reverse procedures to switch to the remote control standby mode.

2nd exemplary embodiment

Figure 5:
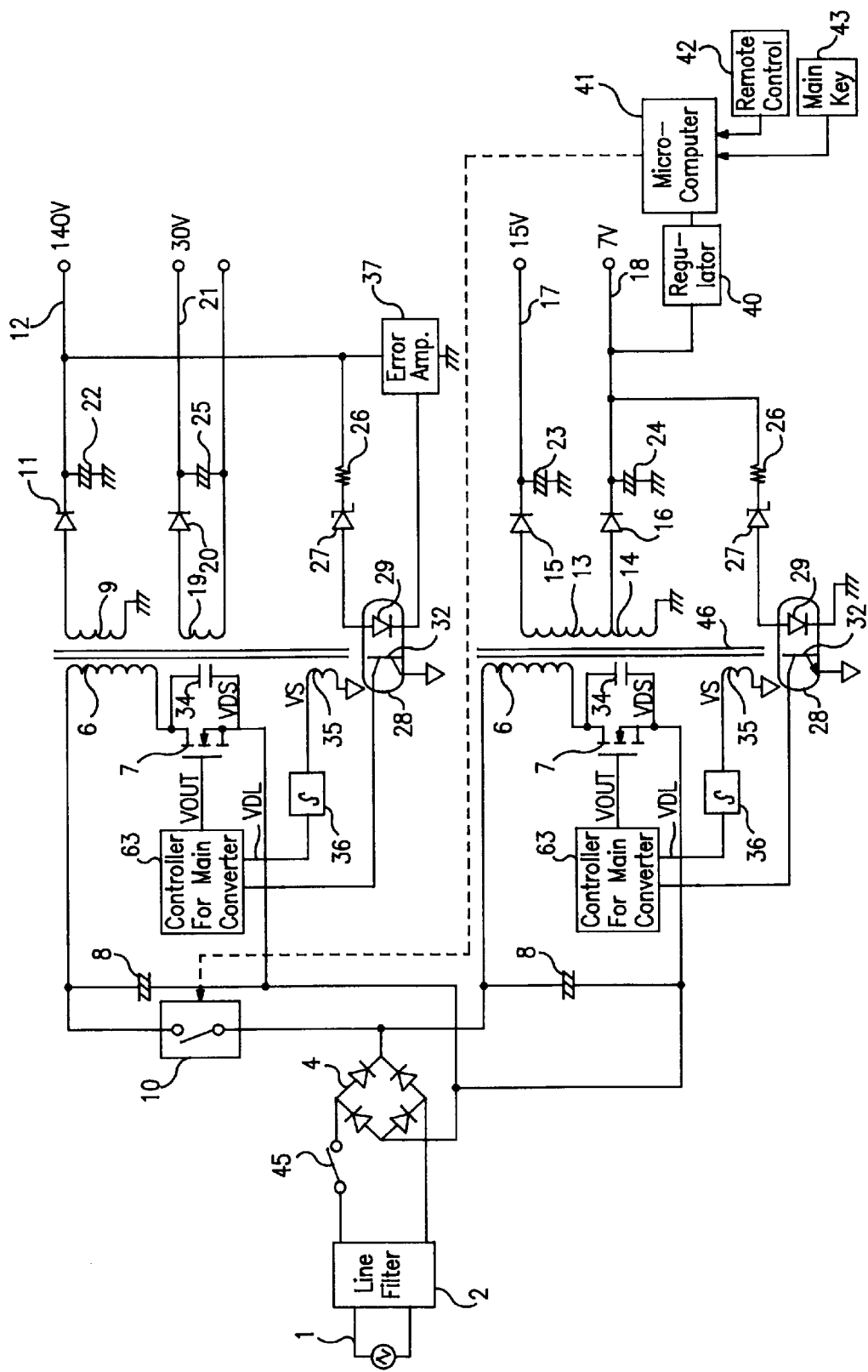
FIG. 5 is an electric circuit diagram of a power supply unit according to the second embodiment of the present invention.

FIG. 5 is an electrical diagram of a power supply unit for video display device in the second exemplary embodiment of the present invention.

In the first exemplary embodiment, the DC output voltage terminals 12, 17, 18, and 21 are drawn from the secondary windings 9, 13, 14, and 19 of the transformer 5 for the main converter of one switching power supply.

A difference in the second exemplary embodiment is that the switching power supply is divided to two sections. Same components including the controller 63 for the main converter, FET 7, and photocoupler 28 in the first exemplary embodiment are provided on a transformer 46 for the main converter of a separate second switching power supply which is provided separately from the transformer 5 for the main converter.

Parts in FIG. 5 which have same functions as those in FIG. 1 are given the same codes, and their explanation is omitted here.

In FIG. 5, the relay switch 10 is inserted to the primary side of the transformer 5 for the main converter.

When the main relay switch 45 turns on, the voltage of the AC power 1 is input to the main bridge rectifier 4 through the line filter 2. The voltage of the AC power 1 is rectified by the main bridge rectifier 4, and smoothed with the smoothing electrolytic capacitor 8 for the second switching power supply.

When the voltage of the smoothing electrolytic capacitor 8 reaches a certain level, the controller 63 for the main converter of the second switching power supply activates and voltage is generated in the secondary windings 13 and 14 of the transformer 46 for the main converter.

Here, the control signal of the microcomputer 41 is initially set to turn off the relay switch 10.

Since the relay switch 10 is turned off, the first switching power supply does not activate, and accordingly, the voltage does not occur in the DC output voltage terminal 12 at the secondary side to operate the deflecting and high-voltage circuit connected thereof.

Voltage of the DC output voltage terminals 17 and 18 of the second switching power supply increase. When the output voltage of the terminal 18 reaches 7V, the current flows through the Zener diode 27, and light emitting diode 29 in the photocoupler 28 so as to level off the output at 7V, same as in the prior art.

When the output voltage reaches 7V, the regulator 40 supplies 5 V DC voltage to the microcomputer 41 to start its operation. After operation of the microcomputer 41 stabilizes, it outputs the control signal to turn off the regulator which supplies stable voltage to the signal processor (not illustrated), in order to suppress extra power consumption (hereafter referred to as the remote control standby mode).

Explanation for the controller 63 for the main converter is omitted here since its operation is same as the first exemplary embodiment.

When the power key on the remote control or the television set is pressed, the microcomputer 41 decodes the input signal from the remote control receiver 42 or the main key 43, and first outputs the control signal to turn on the 3-terminal regulator (not illustrated) which supplies power to the signal processor.

When the 3-terminal regulator (not illustrated) turns on, the voltage is supplied to the signal processor to start its operation. After the processor stabilizes, the microcomputer 41 outputs a range of data to the signal processor for initialization, and after a certain period, outputs the control signal for turning on the relay switch 10.

Figure 6:
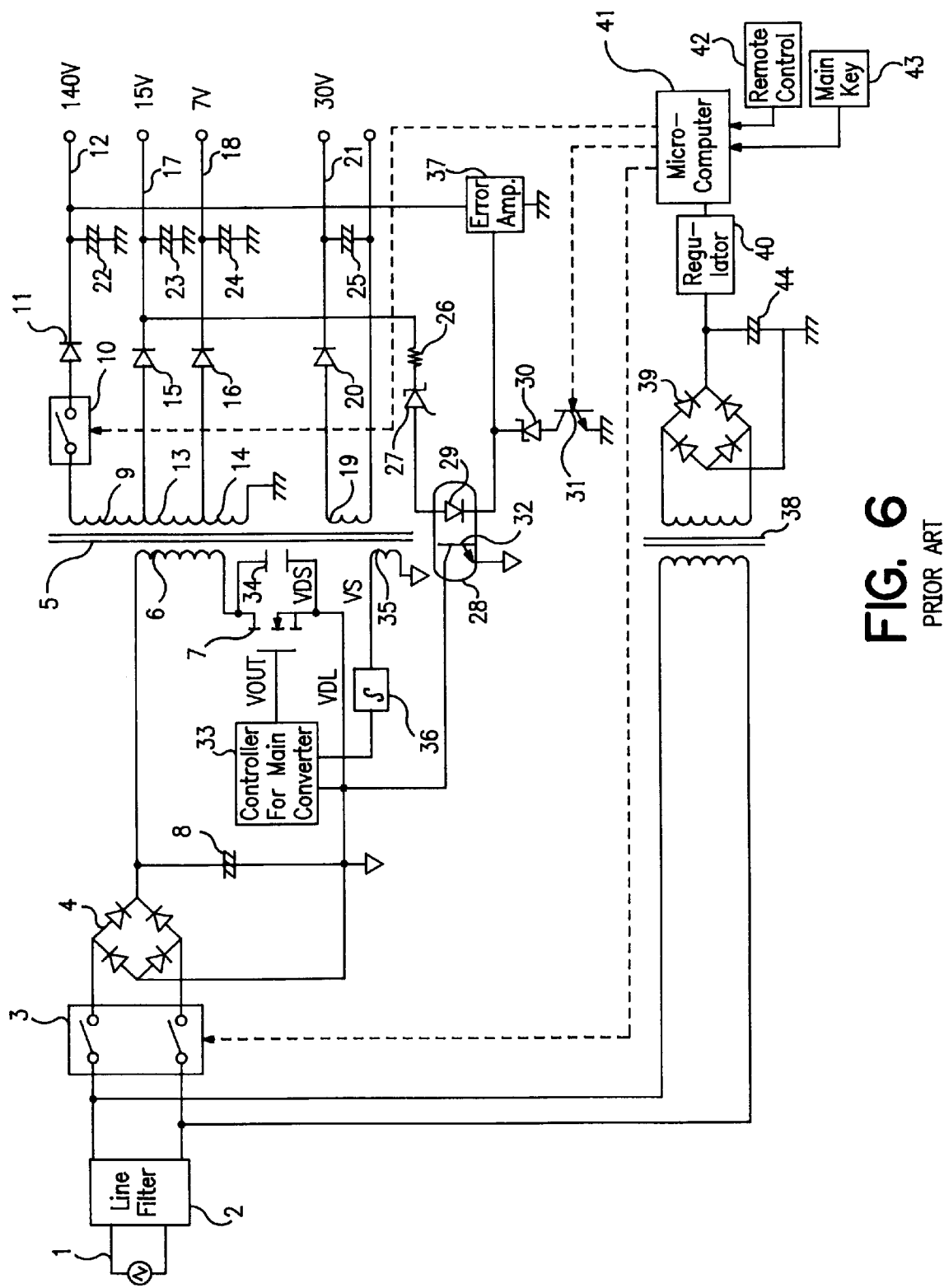
FIG. 6 is an electric circuit diagram of a prior art power supply unit for a television set.

Operation of the first switching power supply after the relay switch 10 turns on is the same as that in the prior art illustrated in FIG. 6. Operation of the second switching power supply in the TV mode is also same as that in the prior art illustrated in FIG. 7.

When the power key on the remote control or the television set is pressed in the TV mode, the power supply unit follows the reverse procedures to switch to the remote control standby mode.

Thus, the transformer for the switching power supply in both first and second exemplary embodiments can be made smaller than that of the prior art by dividing the switching power supply to two sections.

Furthermore, the switching frequency of the switching power supply in the first and second exemplary embodiments in the TV mode is about 150 kHz, while that of the prior art is about 80 kHz.

This enables to make parts such as transformer, FET, electrolytic capacitor, and rectifying diode further smaller, avoiding increased cost compared to the prior art.

Accordingly, the present invention provides a smaller power supply unit, which further saves energy in the remote control standby mode, for video display devices.

The power supply unit of the present invention has a general application in supplying power to electronic devices. Although the exemplary embodiment of the invention has been described with respect to its use in supplying power to video display devices including CRT (cathode ray tube) and LCD (liquid crystal display) display devices, the invention is not limited to this application. Additional applications of the power supply unit of the present invention include but are not limited to VTRs, TVs, and audio appliances.

It will be appreciated that modifications may be made in the present invention. The preferred embodiments described herein are therefore illustrative and not restrictive. The scope of the invention being indicated by the appended claims and all modifications which come within the true spirit of the claims are intended to be embraced therein.

What is claimed is:

1. A switching power supply unit comprising:
   ON period control means for controlling an ON period;
   minimum OFF period setting means for setting a minimum time amount for an OFF period; and
   OFF period control means for controlling the setting of the OFF period;
   wherein said ON period control means controls output voltage of said switching power supply unit by controlling said ON period while said OFF period control means fixes the OFF period to the minimum time amount for the OFF period; and
   said OFF period control means controls output voltage of said switching power supply unit by controlling the OFF period while said ON period control means fixes the ON period to a fixed minimum time amount of said ON period responsive to the output voltage of said switching power supply unit dropping.

2. A power supply unit according to claim 1, wherein said controller for the main converter comprises an OFF period setting circuit, wherein said OFF period setting circuit determines an OFF period based on a specified minimum OFF period and a period controlled by a feedback signal.

3. A power supply unit according to claim 1, including a transformer and wherein said controller for the main converter comprises:
   a capacitor
   an ON period controller which discharges voltage charged in said capacitor and controls an ON period based on the terminal voltage of said capacitor and a control voltage in response to a feedback signal;

an OFF period controller which charges said capacitor and controls the OFF period based on the terminal voltage of said capacitor and the control voltage in response to a feedback signal; and a transformer reset detector which suppresses the turning on of a switching device during resonance of said transformer.

4. A power supply unit according to claim 1, wherein said controller for the main converter comprises:

a capacitor;

means for setting a specified voltage; and an OFF period controller which increases charge voltage of said capacitor to said specified voltage at a first rate of charge and then further increases voltage at a rate of charge less than the first rate of charge, to a voltage above said specified voltage to a control voltage, the control voltage being based on a feedback signal.

5. A power supply unit according to claim 1, wherein said controller for the main converter comprises an OFF period controller, the OFF period controller comprising:

means for setting a specified voltage and means for charging voltage of a capacitor to said specified voltage at substantially high speed, wherein said means for charging voltage is used for determining a minimum OFF period.

6. A power supply unit according to claim 1 wherein the power supply unit is a power supply unit for a video display device, the power supply unit comprising:

an output voltage terminal for outputting multiple levels of voltage;

a first output voltage terminal for outputting voltage applied to a display drive circuit of the video display device using a switching means; and a second output voltage terminal for outputting voltage applied to a controller which controls on and off of said switching means;

whereby an OFF period setting of the power supply unit is extended when said switching means is turned off.

7. A power supply unit according to claim 1 wherein the power supply unit is a power supply unit for a video display device, the power supply unit comprising:

a first switching power supply for supplying power supply voltage to a display drive circuit of the video display device and a second switching power supply for supplying power supply voltage to a signal processor and a range of controllers; whereby an OFF period setting of said second switching power supply is extended when said first switching power supply is turned off by a switching means.

8. A switching power supply unit comprising:

i) a first switching power supply unit;

ii) a second switching power supply unit for supplying power for less load than said first switching power supply unit supplies, said second switching power supply unit comprising:

a) means for switching on or off power for said first switching power supply unit;

b) ON period control means for controlling ON period;

c) minimum OFF period setting means for setting a minimum time amount of an OFF period;

d) OFF period control means for controlling the setting of the OFF period;

wherein said ON period control means controls output voltage of said switching power supply unit by controlling the ON period when said ON period control means fixes the OFF period to said minimum time amount of said OFF period while said second switching power supply unit switches on power for said first switching power supply unit; and said OFF period control means controls output voltage of said second switching power supply unit by controlling the OFF period when said ON period control means fixes the ON period to a fixed minimum ON period while said second switching power supply unit switches off power for said first switching power supply unit.

9. A power supply unit according to claim 8, wherein the power supply unit is a power supply unit for a video display device, and the first load is a display drive circuit of the video display device.

* * * * *